Patented Nov. 18, 1947

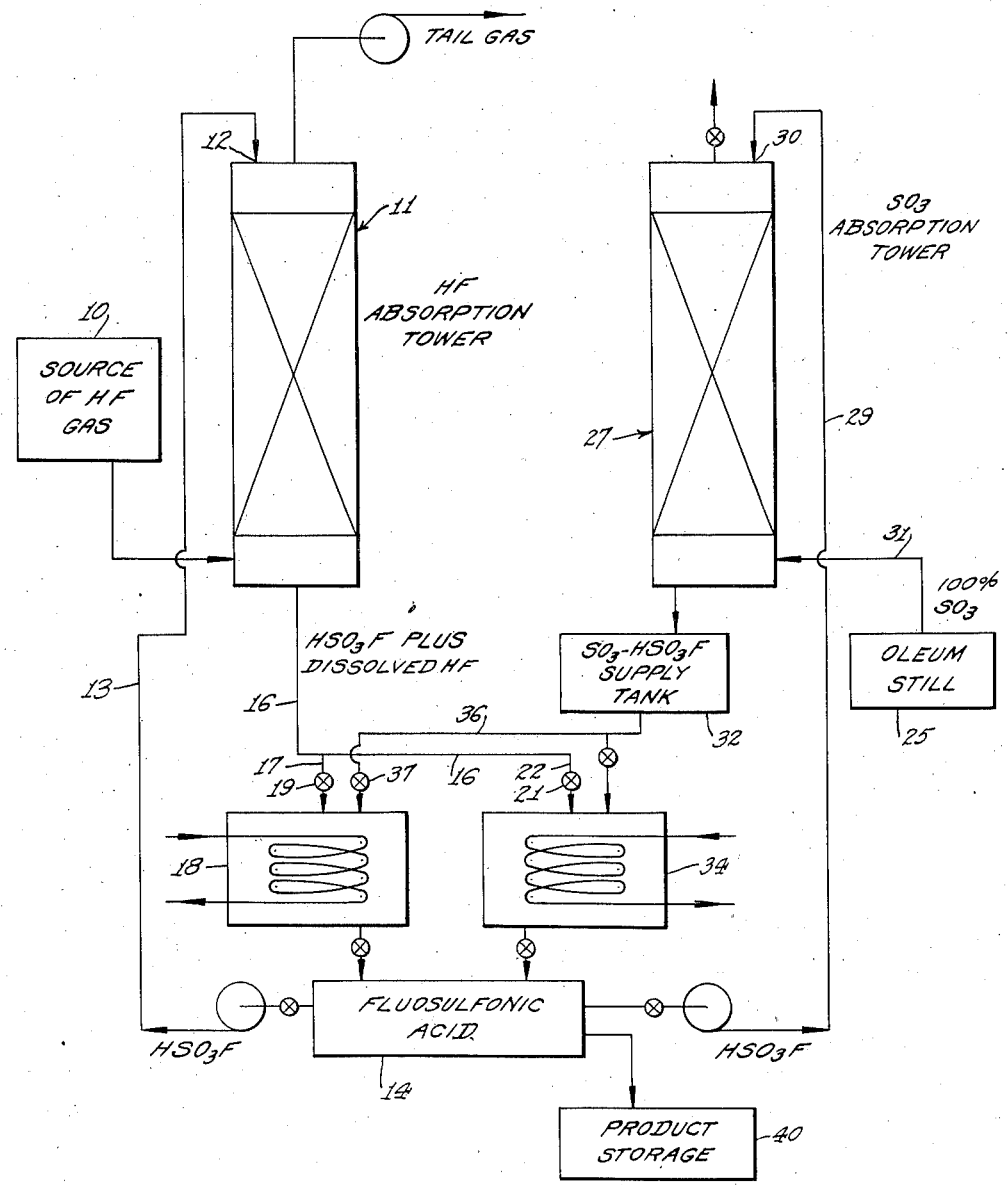

2,430,963

UNITED STATES PATENT OFFICE 2,430,963

MANUFACTURE OF FLUOSULFONIC ACID

Richard Stephenson, Long Island City, N. Y., and William E. Watson, West Orange, N. J., assignors to General Chemical Company, New York, N. Y., a corporation of New York Application November 27, 1944, Serial No. 565,294

2 Claims. (Cl. 23—139)

This invention is directed to manufacture of fluosulfonic acid ($HSO_3F$), particularly fluosulfonic acid containing no dissolved HF, and preferably to production of substantially pure fluosulfonic acid containing no dissolved HF or $SO_3$.

Fluosulfonic acid may be made by effecting combination of hydrogen fluoride and sulfur trioxide. The forms of hydrogen fluoride and sulfur trioxide most readily available commercially are as gases, such as the HF gas produced by reaction of fluorspar and sulfuric acid, and the $SO_3$ gas formed by catalytic oxidation of $SO_2$ to $SO_3$. During recent attempts to develop processes for making fluosulfonic acid by gas-in-liquid absorption procedures commonly used in the chemical arts, it was found markedly difficult to make a fluosulfonic acid product which does not contain either an excess of HF or an excess of $SO_3$, the chief reasons being the substantial solubility of both HF and $SO_3$ in fluosulfonic acid, fluctuations of the HF and/or $SO_3$ contents of commercial gases, and the mechanical difficulties encountered in satisfactorily regulating the end point of reaction of a gas-liquid contacting operation in which one or more of the reactants is soluble in the reaction product. Because of these factors, a given apparatus unit during one time interval formed a fluosulfonic acid product containing an excess of HF, and during another interval a product containing an excess of $SO_3$. Variability of the reaction has been such that it has been practically impossible to make products of consistent composition.

This invention aims to provide a process by which, if desired, substantially pure fluosulfonic acid containing substantially no dissolved HF or $SO_3$ may be made without the use of procedural steps which are unreliable and difficult to control.

The accompanying drawing shows diagrammatically apparatus in which a preferred embodiment of the process of the present invention may be carried out.

On the drawing, 10 indicates a source of HF gas which may be made in any suitable manner. For example, one such gas is a crude HF gas formed by reaction of sulfuric acid and fluorspar as known in the art relating to the manufacture of aqueous hydrofluoric acid. Typical gases of this nature may contain, by volume, from 40-80% HF, 2-15% $SiF_4$, a small amount of $SO_2$, and water vapor depending upon the moisture content of the fluorspar and the strength of the acid used in the fluorspar-sulfuric acid reaction zone. Since water and fluosulfonic acid react to form HF and $H_2SO_4$, in the present process, it is preferred to utilize substantially anhydrous HF gases which, if desired, may be made by drying crude wet HF gas in any suitable way. Alternatively, hydrogen fluoride gas containing substantially no water may be produced by utilizing in a fluorspar-sulfuric acid reaction zone a sufficient quantity of oleum of strength and amount sufficient to form 100% $H_2SO_4$ with all $H_2O$ brought into the system, i. e. as moisture in the fluorspar or as water content of any sulfuric acid used which may be of strength less than 100%.

In the practice of the present invention, the HF gas, at approximately room temperature, is fed into contact with fluosulfonic acid in any suitable gas-liquor contacting apparatus. Thus, the cool crude HF gas may be introduced into the bottom of an absorption tower 11 into the top of which substantially pure fluosulfonic acid is fed by means of a spray distributor 12 and pipe 13 connected to tank 14. The absorbing tower may be unobstructed or packed, and if desired a plurality of towers connected in series may be used, and absorption carried out on the counter-current principle.

Temperature conditions maintained during the contacting operation may be anything such as to hold the partial pressure of HF over the fluosulfonic acid in the absorbing zone to a point less than the partial pressure of HF in the incoming crude HF gas stream. Preferably, temperatures in the absorbing zone are maintained in the neighborhood of 30° C. and ordinarily not higher than 40° C. Absorption of HF by the fluosulfonic acid develops some heat and the resulting temperature increase may be offset by adequate cooling of the fluosulfonic acid during absorption or prior to introduction of the fluosulfonic acid into the tower. The absorption operation is preferably counter-current, and the quantity of fluosulfonic acid fed into the tower and rates of flow of gas and liquor are controlled so as to provide for substantially complete absorption of HF out of the gas stream. Depending upon the particular design of tower 11, cooling facilities, and HF strength of incoming gas, the quantity of fluosulfonic acid charged into the top of the tower may be regulated so that the $HSO_3F$ liquid effluent of the tower contains from say 3 to 50% by weight of dissolved HF. Under the absorbing temperatures and conditions indicated, solubility of $SiF_4$ in fluosulfonic acid is substantially nil and, if present in the incoming gas, $SiF_4$ and other constituents such as $SO_2$, $CO_2$ and air exit the top of the tower and are discharged from the system as tail gas. Assuming use of a substantially dry HF gas and a substantially pure $HSO_3F$ absorbent, there is produced an absorbing tower effluent liquor consisting of $HSO_3F$ and dissolved HF in the variable amounts indicated, and such liquor is run thru pipes 16 and 17 into tank 18, the valve 21 in pipe 22 being closed.

In accordance with the preferred embodiment of this invention, substantially pure fluosulfonic acid is made by incorporating, with a substantially anhydrous liquor consisting of fluosulfonic acid and dissolved HF, a substantially anhydrous liquid mixture consisting of fluosulfonic acid and dissolved $SO_3$. Since in the practice of this embodiment, all of the $SO_3$ constituent of the final $HSO_3F$ product is brought into the system as the $SO_3$ constituent of the $HSO_3F$-$SO_3$ mixture, it is preferred to use a mixture which is high in $SO_3$, for example, a mixture consisting of fluosulfonic acid and not less than 50% by weight (of the mixture) of dissolved $SO_3$. Because of high solubility of $SO_3$ in fluosulfonic acid, it is possible to make and use in the instant process, a mixture containing by weight as much as 70% dissolved $SO_3$, the balance being $HSO_3F$.

An $HSO_3F$-$SO_3$ mixture of the kind described may be made conveniently by distilling commercial oleum in a still 25 in such a way as to form a substantially 100% $SO_3$ gas, and dissolving the $SO_3$ in $HSO_3F$. For this purpose, substantially pure fluosulfonic acid is drawn out of tank 14 and run thru pipe 29 and spray head 30 into the top of tower 27, while the $SO_3$ is fed into the bottom of the tower by pipe 31. In tower 27, rates of introduction of fluosulfonic acid and $SO_3$ gas and cooling, by external or other suitable means, of the counter-current contacting operation are regulated so as to effect substantially complete absorption of $SO_3$ and form a substantially anhydrous liquid tower effluent which is fluosulfonic acid containing dissolved $SO_3$ in amount suitable for the particular operation at hand. $SO_3$ absorption temperatures should be held preferably at 40° C. or less. Thus, the liquor collected in tank 32 may contain anywhere from say 10 to 70% by weight of dissolved $SO_3$. Tower 27 may be replaced by a simple externally or internally cooled tank provided with means to bubble sulfur trioxide into a body of fluosulfonic acid. Alternatively, the $HSO_3F$-$SO_3$ mixture may be made by contacting fluosulfonic acid with $SO_3$ gas produced by catalytic oxidation of $SO_2$ to $SO_3$. In this instance, a plurality of contact towers connected in series and provided with suitable coolers and liquor recirculating equipment may be used. The fluosulfonic acid is run into the last tower of the series, and the $SO_3$ gas into the first, absorption being carried out on the counter-current principle, and the number of towers being dependent upon good clean-up of $SO_3$ and the desired dissolved $SO_3$ strength of the $HSO_3F$-$SO_3$ mixture to be formed.

When an adequate amount of $HSO_3F$-HF liquor produced in tower 11 has been run into tank 18, valve 19 is closed and valve 21 is opened to collect the continuing production of tower 11 in tank 34.

Analyses of the liquors in tanks 18 and 32 are made, and depending upon such analyses, there is run into tank 18, thru pipe and valves 36 and 37, such an amount of the $HSO_3F$-$SO_3$ mixture from tank 32 as to provide, in the resulting composite liquor in tank 18, $SO_3$ in quantity preferably substantially equal to the stoichiometric amount required to react with all of the dissolved HF present in tank 18 to form fluosulfonic acid. For example, if the liquor in tank 18 analyzes by weight 90% $HSO_3F$ and 10% HF, and the mixture in tank 32 analyzes by weight 50% $HSO_3F$ and 50% $SO_3$, to each pound of liquor in tank 18 there would be added 0.8 pound of the $HSO_3F$-$SO_3$ mixture from tank 32. During the mixing operation, the liquor in tank 18 is kept at temperature preferably less than about 100° C. to prevent stripping out of HF and vaporization of any of the liquid. The substantially pure fluosulfonic acid thus formed in tank 18 is run into the intermediate collecting tank 14 from which the required amounts of fluosulfonic acid are withdrawn, further cooled if necessary, and recirculated by pipes 13 and 29 over towers 11 and 27. Production of a substantially pure product in tank 34 is effected in the same manner as already described in connection with tank 18, and the make of the process is run out of tank 14 into product storage tank 40.

In some industrial processes, the presence of relatively small amounts of sulfuric acid in fluosulfonic acid is not objectionable and is regarded as a diluent. Thus, in all cases the HF gas from source 10 need not be substantially anhydrous but may contain water in amount such that the quantity of sulfuric acid (formed by reaction of $H_2O$ and $HSO_3F$) in the final product is not above the permissible value for the circumstances at hand.

In certain other processes in which fluosulfonic acid is employed as a reactant, the presence of relatively small amounts of dissolved $SO_3$ in the fluosulfonic acid is not objectionable. Accordingly, while in the practice of the present invention the quantity of available $SO_3$ brought into the process is proportioned so as to provide for the substantially complete elimination of dissolved HF, the amount of $SO_3$ brought into the instant process as in tanks 18 and 34 may be in appreciable excess of that required to get rid of the dissolved HF.

By forming a fluosulfonic acid liquor containing a substantial amount of dissolved HF, and bringing the $SO_3$ into the process in the form of the liquid mixture described, the invention affords the substantial operating advantage of making it possible to accurately proportion the total amounts of HF and $SO_3$ in the system, and accomplish this end by use of a material which, in spite of its permissibly very high $SO_3$ content is non-freezing and remains in fluid, readily handleable condition at room temperature. Accordingly, the invention facilitates production of substantially pure product without the necessity of becoming involved in all the operating difficulties entailed in the determination of the proper end point of a gas-liquid contacting operation.

What is claimed as the invention is:

1. The process for making fluosulfonic acid which comprises forming in one receptacle a fluosulfonic acid liquor containing dissolved HF, and incorporating with said liquor a liquid mixture formed in another receptacle and comprising fluosulfonic acid containing dissolved $SO_3$, the amount of said mixture being such as to introduce, into the resulting liquid, $SO_3$ in quantity at least equal to the stoichiometric amount required to react with HF present to form fluosulfonic acid.

2. The process for making substantially pure fluosulfonic acid which comprises forming in one receptacle a substantially anhydrous liquor consisting of fluosulfonic acid and dissolved HF, and incorporating with said liquor a substantially anhydrous liquid mixture formed in another receptacle and consisting of fluosulfonic acid and dissolved $SO_3$, the amount of said mixture being such as to introduce, into the resulting liquid, $SO_3$ in quantity equal to the stoichiometric amount required to react with HF present to form fluosulfonic acid.

RICHARD STEPHENSON.
WILLIAM E. WATSON.

REFERENCES CITED

The following references are of record in the file of this patent:

FOREIGN PATENTS

| Number | Country | Date |
|---|---|---|
| 16,518 | Great Britain | 1910 |